(12) United States Patent
Mahimkar et al.

(10) Patent No.: US 12,382,310 B2
(45) Date of Patent: Aug. 5, 2025

(54) OPTIMIZATION OF LONG TERM EVOLUTION/FIFTH GENERATION SERVICE THROUGH CONFORMITY-BASED RECOMMENDATIONS

(71) Applicants: AT&T Intellectual Property I, L.P., Atlanta, GA (US); AT&T Mobility II LLC, Atlanta, GA (US)

(72) Inventors: Ajay Mahimkar, Edison, NJ (US); Zihui Ge, Madison, NJ (US); Xuan Liu, Basking Ridge, NJ (US); Yusef Shaqalle, Minneapolis, MN (US); Yu Xiang, Morristown, NJ (US); Jennifer Yates, Morristown, NJ (US); Shomik Pathak, Richardson, TX (US); James Reichel, Kimberly, ID (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 377 days.

(21) Appl. No.: 17/814,100

(22) Filed: Jul. 21, 2022

(65) Prior Publication Data
US 2024/0031829 A1    Jan. 25, 2024

(51) Int. Cl.
*H04L 41/14*     (2022.01)
*H04W 24/02*     (2009.01)
*H04W 28/02*     (2009.01)
*H04W 36/00*     (2009.01)

(52) U.S. Cl.
CPC ....... *H04W 24/02* (2013.01); *H04W 28/0226* (2013.01); *H04W 36/0072* (2013.01)

(58) Field of Classification Search
CPC ............ H04W 24/02; H04W 28/0226; H04W 36/0072
See application file for complete search history.

(56) References Cited

U.S. PATENT DOCUMENTS 11,212,710 B1 * 12/2021 Mahimkar ............ H04W 48/12
2022/0394531 A1 * 12/2022 Jeong ...................... H04L 41/12

FOREIGN PATENT DOCUMENTS

| WO | WO-2020079678 A1 * | 4/2020 | ............. G06N 3/045 |
| WO | WO-2022066073 A1 * | 3/2022 | ............. G06N 20/00 |

\* cited by examiner

*Primary Examiner* — Charles N Appiah
*Assistant Examiner* — Nikita H Patel

(57) ABSTRACT

A method performed by a processing system including at least one processor includes grouping a plurality of nodes of a telecommunications network into a plurality of reference groups, based on a plurality of configuration attributes and on a plurality of load, mobility, radio frequency attributes for the plurality of nodes, selecting a first reference group of the plurality of reference groups, where the first reference group includes a subset of the plurality of nodes, selecting a first configuration parameter of the first reference group to be tuned, identifying a first value for the first configuration parameter that is most prevalent among the subset of the plurality of nodes, and setting the first configuration parameter for all nodes in the subset of the plurality of nodes to the first value.

20 Claims, 4 Drawing Sheets

| Equipment Vendor | Radio Frequency | Morphology | Coverage Range | Traffic Volume | Handover Volume | Reference Group |
|---|---|---|---|---|---|---|
| Vendor X | 1900 MHz | Urban | 3 miles | Very high | Very high | $C_1$ |
| Vendor X | 1900 MHz | Urban | 3 miles | Very low | Very high | $C_2$ |
| Vendor X | 1900 MHz | Urban | 3 miles | Very high | Very low | $C_3$ |
| Vendor X | 2100 MHz | Urban | 2 miles | Very high | Very high | $C_4$ |
| Vendor Y | 2100 MHz | Rural | 3 miles | Very high | Very low | $C_5$ |
| Vendor Y | 750 MHz | Rural | 4 miles | Very low | Very low | $C_6$ |

FIG. 3 ns of their cellular networks in order to optimize coverage, support seamless handovers, minimize channel interference, and improve the quality of experience of end users. Cellular networks offer the opportunity to tune a wide range of configuration parameters related to layer management (balancing traffic across different cellular frequencies), handover optimization, interference management, outage restoration, and coverage and capacity management.
OPTIMIZATION OF LONG TERM EVOLUTION/FIFTH GENERATION SERVICE THROUGH CONFORMITY-BASED RECOMMENDATIONS The present disclosure relates generally to cellular networks, and relates more particularly to devices, non-transitory computer-readable media, and methods for optimizing long term evolution/fifth generation network service through conformity-based recommendations.

BACKGROUND

Cellular network operators frequently tune the configurations of their cellular networks in order to optimize coverage, support seamless handovers, minimize channel interference, and improve the quality of experience of end users. Cellular networks offer the opportunity to tune a wide range of configuration parameters related to layer management (balancing traffic across different cellular frequencies), handover optimization, interference management, outage restoration, and coverage and capacity management.

Given the outdoor nature of cellular networks and the diverse radio channel footprint to manage attributes like varying morphology, seasonal changes, user densities, mobility patterns, events, and diverse traffic demands, cellular network engineers can tune the configuration differently across different geographic locations in order to optimize network performance and service. As an example, the settings for handover configuration, transmission power, and antenna tilt can be configured one way for a downtown location and another way for a highway location with greater user mobility. Traffic patterns across different times of day or different times of year (e.g., a seasonal ski resort's demand will typically be greater in winter than in summer) could require network engineers to specially adjust parameters to manage increased load on the network.

SUMMARY

The present disclosure broadly discloses methods, computer-readable media, and systems for optimizing long term evolution/fifth generation network service through conformity-based recommendations. In one example, a method performed by a processing system including at least one processor includes grouping a plurality of nodes of a telecommunications network into a plurality of reference groups, based on a plurality of configuration attributes and on a plurality of load, mobility, radio frequency attributes for the plurality of nodes, selecting a first reference group of the plurality of reference groups, where the first reference group includes a subset of the plurality of nodes, selecting a first configuration parameter of the first reference group to be tuned, identifying a first value for the first configuration parameter that is most prevalent among the subset of the plurality of nodes, and setting the first configuration parameter for all nodes in the subset of the plurality of nodes to the first value.

In another example, a non-transitory computer-readable medium may store instructions which, when executed by a processing system including at least one processor, cause the processing system to perform operations. The operations may include grouping a plurality of nodes of a telecommunications network into a plurality of reference groups, based on a plurality of configuration attributes and on a plurality of load, mobility, radio frequency attributes for the plurality of nodes, selecting a first reference group of the plurality of reference groups, where the first reference group includes a subset of the plurality of nodes, selecting a first configuration parameter of the first reference group to be tuned, identifying a first value for the first configuration parameter that is most prevalent among the subset of the plurality of nodes, and setting the first configuration parameter for all nodes in the subset of the plurality of nodes to the first value.

In another example, a device may include a processing system including at least one processor and a non-transitory computer-readable medium storing instructions which, when executed by the processing system, cause the processing system to perform operations. The operations may include grouping a plurality of nodes of a telecommunications network into a plurality of reference groups, based on a plurality of configuration attributes and on a plurality of load, mobility, radio frequency attributes for the plurality of nodes, selecting a first reference group of the plurality of reference groups, where the first reference group includes a subset of the plurality of nodes, selecting a first configuration parameter of the first reference group to be tuned, identifying a first value for the first configuration parameter that is most prevalent among the subset of the plurality of nodes, and setting the first configuration parameter for all nodes in the subset of the plurality of nodes to the first value.

BRIEF DESCRIPTION OF THE DRAWINGS

The teachings of the present disclosure can be readily understood by considering the following detailed description in conjunction with the accompanying drawings, in which:

FIG. 3, for instance, illustrates a table from which a plurality of example reference groups and their corresponding configuration attributes and load, mobility, radio frequency attributes may be determined.

To facilitate understanding, similar reference numerals have been used, where possible, to designate elements that are common to the figures.

DETAILED DESCRIPTION

Figure 1:
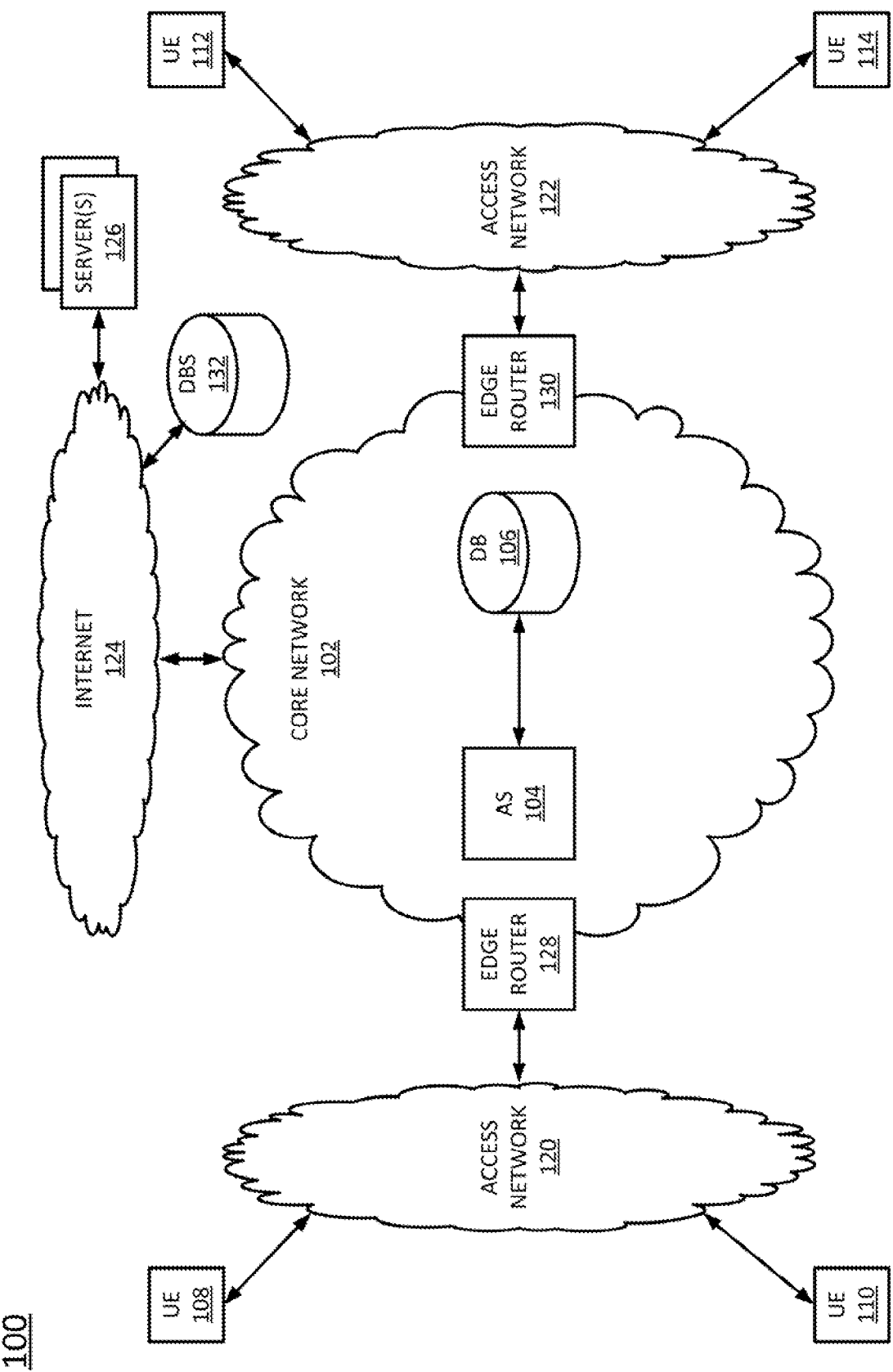
FIG. 1 illustrates an example system in which examples of the present disclosure for optimizing long term evolution/fifth generation network service through conformity-based recommendations may operate.

The present disclosure broadly discloses methods, computer-readable media, and systems for optimizing long term evolution/fifth generation network service through conformity-based recommendations. As discussed above, cellular network operators frequently tune the configurations of their cellular networks in order to optimize coverage, support seamless handovers, minimize channel interference, and improve the quality of experience of end users. Cellular networks offer the opportunity to tune a wide range of configuration parameters related to layer management (balancing traffic across different cellular frequencies), handover optimization, interference management, outage restoration, and coverage and capacity management.

Given the outdoor nature of cellular networks and the diverse radio channel footprint to manage attributes like varying morphology, seasonal changes, user densities, mobility patterns, events, and diverse traffic demands, cellular network engineers can tune the configuration differently across different geographic locations in order to optimize network performance and service. As an example, the settings for handover configuration, transmission power, and antenna tilt can be adjusted to one configuration for a downtown location and adjusted to another configuration for a highway location with greater user mobility. Traffic patterns across different times of day or different times of year (e.g., a seasonal ski resort's demand will typically be greater in winter than in summer) could require network engineers to specially adjust configuration parameters to manage increased load on the network.

Although network configuration parameters can be easily tuned, it is less easy to find the optimal settings for the configuration parameters given the extremely large number of configuration parameters, the complex dependencies among these configuration parameters, continuous network evolution (e.g., virtualization and containerization of network functions), introduction of new technologies (e.g., 5G cellular service), and the need to support a diverse array of applications (e.g., voice, video, data) as well as emerging applications (e.g., extended reality, Internet of Things, autonomous cars and drones, etc.). Any misconfigurations, or even poorly selected settings, can negatively impact quality of service.

Conventionally, knowledge of the network configuration parameter tuning process is distributed across network engineers having different domain knowledge and experience, making the knowledge difficult to capture in a centralized manner. The modern standard of practice in large operational environments is to discuss and document findings using best practices forums. New configuration parameter settings are tested out in one part of a network, and, based on performance enhancements, decisions are made as to whether to roll the new configuration parameter settings out to the rest of the network. This practice works well for configuration parameters that change infrequently (also often referred to as "global" parameters), as the values for such configuration parameters are uniform across the network and will not vary. However, the values for other types of configuration parameters (also often referred to as "local" parameters) may change frequently. Given the large variation and magnitude of the changes for these local parameters, it becomes very difficult not only to systematically document findings across different parts of a network, but also to detect and implement changes across the entire network.

Examples of the present disclosure provide a method for tuning local network configuration parameters using conformity-based recommendations and performance-based filtering. In one example, best practices knowledge is automatically derived by carefully mining data and exploring the massive existing configuration in a network. It is assumed that if network engineers have optimally tuned major portions of the network configuration and that enhanced quality of service can be attributed to that tuning, then the dependency can be captured using a conformity model, and the network parameter settings can be recommended for application to other, overlooked portions of the network. This approach may be especially useful for tuning local network performance parameters when network engineers in one part of a network (e.g., downtown New York City) have identified a better configuration that can be potentially applied to other similar parts of the network (e.g., uptown New York City) that are managed by different groups of network engineers.

Examples of the present disclosure pursue configuration conformity with the assumption that similar network locations will have similar settings for network configuration parameters. Reference groups may be constructed for groups of similar network locations, and the network configuration parameters settings that are observed across a majority of locations in a reference group may be recommended for all locations in the reference group. Conformity within a reference group may thus be achieved using majority rule and may represent the optimal setting achieved by the network engineers over time. In one example, reference groups may be discovered using several network attributes, such as location morphology, radio channel frequency, downlink bandwidth, radio coverage, traffic demands, and handover patterns.

Majority voting-based recommendations will work well in most scenarios, except for scenarios in which a minority set of network configuration parameter settings has been tailored to address a unique combination of traffic, handovers, and/or channel quality in a network location. Thus, further examples of the present disclosure apply performance-based filtering to recommended settings for network configuration parameters in order to ensure that minority sets of network configuration parameters that have historically been shown to improve quality of service (as compared to the majority set of network configuration parameters) are not lost. These and other aspects of the present disclosure are discussed in greater detail below in connection with the examples of FIGS. 1-4.

To further aid in understanding the present disclosure, FIG. 1 illustrates an example system 100 in which examples of the present disclosure for optimizing long term evolution/fifth generation network service through conformity-based recommendations may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 4:
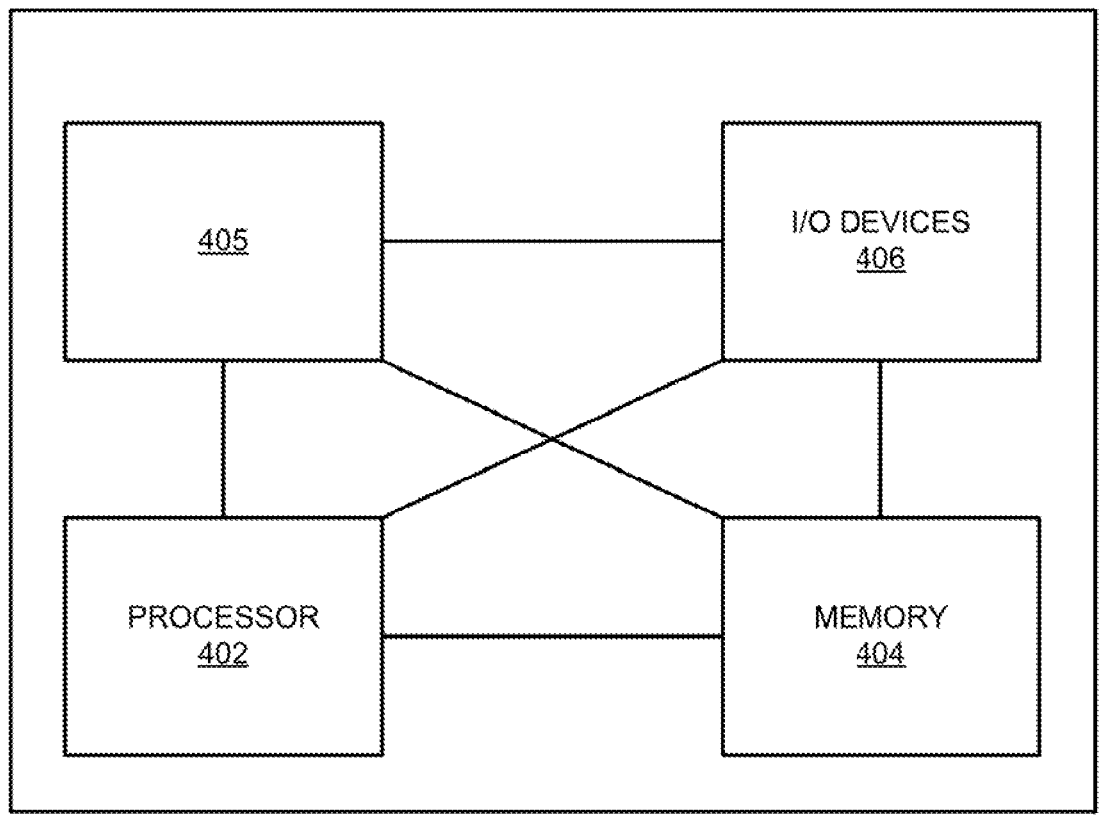
FIG. 4 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for optimizing long term evolution/fifth generation network service through conformity-based recommendations, as described herein. The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to optimize long term evolution/fifth generation network service through conformity-based recommendations. In particular, the AS 104 may be configured to group network nodes into reference groups. Within the context of the present disclosure, a "node" of a telecommunications network refers to any hardware element of the telecommunications network (e.g., a cellular base station, such as an eNodeB in an LTE network or a gNodeB in a 5G network, an individual cell of a cellular base station, or the like). A "reference group" refers to a set of network nodes that share similar (e.g., the same or exhibiting a variance within a predefined threshold) configuration attribute and load, mobility, radio frequency (LMR) attribute values. Each reference group that is determined by the AS 104 will include a subset of the nodes in the system 100.

The AS 104 may also be configured to generate a recommended value for a configuration parameter of the nodes within a reference group, based on a conformity-driven strategy. In one example, the AS 104 may identify, for a given configuration parameter, the majority value among the nodes in a reference group. The majority value may be the most prevalent or most frequently occurring value for the given configuration parameter within the reference group. In one example, the AS 104 may recommend that the given parameter be set to the majority value for all of the nodes in the reference group. However, in some examples, the AS 104 may not recommend the majority value as a setting for all nodes. For instance, if a node in the reference group has had the given configuration parameter set to an alternate or minority value (i.e., a value other than the majority value), and the performance of the system 100 has shown improvement while the minority value has been in use, then the AS 104 may not recommend that the node for which the given configuration parameter was set to the minority value switch to the majority value. In other examples, such as where there has been no observed improvement in network performance that can be attributed to the majority value or where there is insufficient data to evaluate the impact of the majority value on network performance, the AS 104 may also refrain from recommending that nodes for which the given configuration parameter is set to a minority value be switched to the majority value.

Values for configuration parameters, as well as network performance statistics and configuration attributes and LMR attributes of network nodes, may be stored in the DB 106 and/or DB 132. In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for optimizing long term evolution/fifth generation network service through conformity-based recommendations, as described herein. One example method for optimizing long term evolution/fifth generation network service through conformity-based recommendations is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
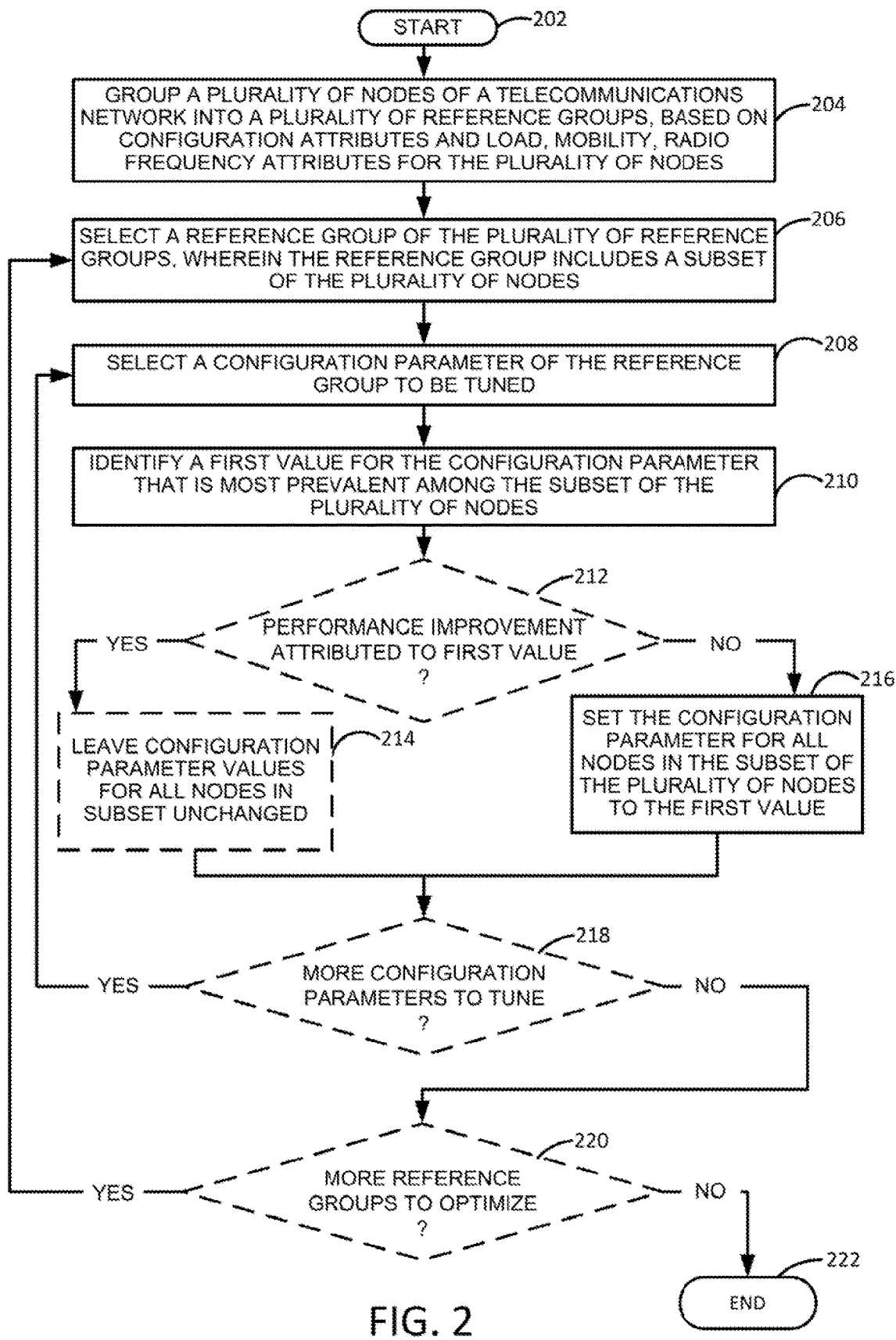
FIG. 2 illustrates a flowchart of an example method for optimizing long term evolution/fifth generation network service through conformity-based recommendations, in accordance with the present disclosure.

FIG. 2 illustrates a flowchart of an example method 200 for optimizing long term evolution/fifth generation network service through conformity-based recommendations, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 400, and/or a processing system 402 (e.g., having at least one processor) as described in connection with FIG. 4 below. For instance, the computing device 400 may represent at least a portion of the AS 104 in accordance with the present disclosure. For illustrative purposes, the method 200 is described in greater detail below in connection with an example performed by a processing system in an Internet service provider network, such as processing system 402.

The method 200 begins in step 202 and proceeds to step 204. In step 204, the processing system may group a plurality of nodes of a telecommunications network into a plurality of reference groups, based on a plurality of configuration attributes and on a plurality of LMR attributes for the plurality of nodes.

In one example, the configuration attributes may comprise static attributes, or attributes that do not tend to vary substantially over time, such as hardware type, equipment vendor, downlink channel bandwidth, and the like. Configuration attributes of a cell may vary from radio channel frequency, cell type (e.g., serving firstnet, or Internet of Things, or regular class of service), morphology (e.g., urban/suburban/rural locations), base station type (e.g., macro, pico, DAS, cloud-RAN, etc.), hardware version, downlink channel bandwidth, coverage range, downlink MIMO modes, software version of the base station, and other cells on the same base station and their attribute values.

LMR attributes may comprise dynamic attributes that are more likely to vary dynamically over time, such as traffic byte volumes, number of user sessions, intra and inter frequency handover patterns, channel qualities, and the like. It is noted that LMR attributes may play an important role in the tuning of configuration parameters by network engineers. For instance, network nodes with similar configuration attributes but carrying significantly different amounts of traffic and supporting different handover patterns could have different settings for the respective configuration parameters. Thus, if one were to disregard LMR attributes, the quality of the recommended configuration parameters might not be optimal. As such, examples of the present disclosure consider both configuration (e.g., static) attributes and LMR (e.g., dynamic) attributes when constructing reference groups. It should be noted that when step 204 refers to grouping the plurality of nodes into the plurality of reference groups based on "a plurality of LMR attributes" for the plurality of nodes, this does not mean that the reference groups are based on a plurality of load attributes for the plurality of nodes, a plurality of mobility attributes for the plurality of nodes, and a plurality of RF attributes for the plurality of nodes. Rather, the reference groups are based on a plurality of attributes that fall within the category of LMR attributes as defined above, and may include any combination of load attributes, mobility attributes, and/or RF attributes.

In one example, the configuration attributes and the LMR attributes that are used to define the reference groups (e.g., that are likely to play a significant role in configuration decisions) may be carefully selected. For instance, the configuration attributes may be selected using a supervised machine learning technique, such as a regression technique, a classification technique, a naïve Bayesian model, a decision tree, a random forest model, a neural network, or a support vector machine (SVM). In a further example, a collaborative filtering approach with a Chi-square test of independence is used to identify associations between configuration attributes and configuration parameters. Without the collaborative filtering, it is possible that too many configuration attributes would result in a very large number of sparse reference groups (leading, in turn, to poor quality of recommendations for configuration parameter values). In one example, the Chi-square test statistic $X_{S,P}^2$ for each configuration attribute S and each configuration parameter P, may be given by:

$$X_{S,P}^2 = \sum_{i=1}^{N} \sum_{j=1}^{M} \frac{(O_{i,j} - E_{i,j})^2}{E_{i,j}} \qquad \text{(EQN. 1)}$$

where N is the number of values that the configuration attribute S takes, M is the number of values that the configuration parameter P takes, $O_{i,j}$ d is the observed count for the $i^{th}$ row (configuration attribute value) and the $j^{th}$ column (configuration parameter value), and $E_{i,j}$ is the expected cell count in the $i^{th}$ row and $j^{th}$ column of a contingency table.

The contingency table captures the total counts for each pair of configuration attribute and configuration parameter values across all nodes of the telecommunications network, such that:

$$E_{i,j} = \frac{\left(\sum_{i=1}^{N} O_{i,j}\right)\left(\sum_{j=1}^{M} O_{i,j}\right)}{\sum_{i=1}^{N} \sum_{j=1}^{M} O_{i,j}} \quad \text{(EQN. 2)}$$

For each configuration attribute S and each configuration parameter P, the Chi-square test statistic $X_{S,P}^2$ may be compared to the critical value from a Chi-square distribution table with degrees of freedom df=(N−1)(M−1) and a selected (e.g., user-defined) confidence value. If the Chi-square test statistic $X_{S,P}^2$ is greater than the critical value, then the null hypothesis that the configuration attribute S and the configuration parameter P are independent is rejected (implying that there is a dependency between the configuration attribute S and the configuration parameter P). The configuration attribute S may then be added to the list $L^s$ of configuration attributes that are considered important for the configuration parameter P. As an example, the Chi-square test of independence may identify if the radio frequency attribute that can take values such as 700 MHz, 1900 MHz, and 2100 MHz has a dependency with each of the configuration parameter settings.

LMR attributes, unlike configuration attributes, may vary significantly over time (e.g., peak hour patterns versus non-peak hour patterns may be different) and may be represented using time-series data. In one example, the time-series data for LMR attributes may be captured with y-minute time granularity (where, in one example, y=15). The challenge is to construct labels that would help in creating reference groups.

In one example, the LMR attributes may be selected using an unsupervised machine learning technique, such as k-means clustering, that automatically selects LMR attributes. For instance, for each time-series LMR attribute D, a statistic such as mean, median, or maximum over multiple time intervals may first be created for each network node. Next, a vector may be created to represent one value for each network node. k-means clustering may then be applied for each vector in order to identify the labels for each network node. As an example, if k=5, then one could label network nodes as carrying "very high," "high," "medium," "low," or "very low" (e.g., 5 possible labels) traffic volumes. The LMR attribute D may then be added to a list $L^d$ of LMR attributes.

In one example, once the plurality of configuration attributes and the plurality of LMR attributes have been selected for a configuration parameter, a matrix of values can be constructed in which the rows of the matrix represent the network nodes and the columns of the matrix represent the plurality of configuration attributes and the plurality of LMR attributes. A reference group C can then be constructed that includes network nodes whose configuration attributes and LMR attributes match (or match within some threshold tolerance, such as +/−x). It is noted that within a reference group, not all configuration attributes and LMR attributes need be equal for all nodes; only configuration attributes and LMR attributes that are considered relevant for the configuration parameter setting should be equal or similar.

FIG. 3, for instance, illustrates a table 300 from which a plurality of example reference groups and their corresponding configuration attributes and LMR attributes may be determined. For example, referring to the table 300, nodes from equipment Vendor X, with radio frequencies of 1900 MHz, serving urban locations, having a coverage range of three miles, carrying very high traffic volumes, and supporting very high intra and inter frequency handovers, belong to reference group $C_1$. Other reference groups (e.g., example reference groups $C_2$-$C_6$) are defined in a similar manner.

In step 206, the processing system may select a reference group (e.g., a first reference group) of the plurality of reference groups, where the selected reference group includes a subset of the plurality of nodes (i.e., fewer than all nodes of the plurality of nodes). By selecting the reference group, the processing system initiates tuning of the configuration parameters of the nodes (i.e., the subset) that are included in the reference group, as discussed in further detail below.

In one example, different equivalent classes can have different node densities (i.e., numbers of nodes included in the reference group), depending on the network and user characteristics. In one example, reference groups with extremely sparse (e.g., lower than a predefined threshold) node densities may be ignored due to the risk of generating a sub-optimal recommended configuration parameter value. For reference groups containing at least a threshold number of nodes, however, a voting approach may be used to identify a majority configuration setting, as discussed in greater detail below.

In step 208, the processing system may select a configuration parameter (e.g., a first configuration parameter) of the reference group to be tuned. In one example, the configuration parameter may be a parameter related to radio connection management, power control, intra-frequency and inter-frequency layer management, handovers, and interference management. For instance, in one example, the configuration parameter may be one of: the minimum required RX level in a cell, the threshold (in dB) for inter-RAT and inter-frequency measurements, a first threshold for received signal reference power (RSRP) for a serving cell (e.g., if the Inter-RAT measurements are active and their value exceeds the first threshold, then the Inter-RAT measurements may be stopped), a second threshold for RSRP of a serving cell for the start of inter-frequency measurements (e.g., if the values of the inter-frequency measurements are below the second threshold, then inter-frequency measurements may be started), a third threshold for RSRP of a serving cell (e.g., if the RSRP of the serving cell is lower than the third threshold and the RSRP of a neighboring cell is greater than the third threshold, then a handover may be triggered), a fourth threshold for RSRP of intra-frequency of a neighboring cell (e.g., if the RSRP of a serving cell is lower than the third threshold and the RSRP of the neighboring cell is greater than the fourth threshold, then a handover may be triggered), or a maximum output power (e.g., the maximum output power of the cell per antenna carrier in dBm, where the maximum output power is the maximum value for the linear sum of the power of all downlink physical channels that are allowed to be used in a cell). Reference groups are constructed, and configuration parameters are recommended, separately for each configuration parameter, because each configuration parameter could be associated with a different set of correlated configuration attributes and LMT attributes.

In step 210, the processing system may identify a value for the configuration parameter that is most prevalent among the subset of the plurality of nodes (i.e., the nodes of the selected reference group). In other words, the processing system may determine, for the selected configuration parameter, what value or setting is most used or occurs most frequently within the reference group.

In optional step 212 (illustrated in phantom), the processing system may determine whether an observable performance improvement can be attributed to the configuration parameter being set to the first value (for the nodes in the subset of the plurality of nodes for which the configuration parameter was set to the first value). In one example, the performance improvement may relate to the performance of the telecommunications network with respect to voice and data accessibility (e.g., success rate of call establishments), retainability (e.g., success rate of call terminations), downlink and uplink throughput, inter/inter frequency handover success rates, call durations and number of calls, or time spent on each technology.

In one example, setting the configuration parameter to the first value for all nodes in the subset of the plurality of nodes results in optimal configurations for all nodes in the subset only if no minority values (e.g., values for the configuration parameter within the reference group that were not the most prevalent or most frequently occurring value) provided better performance that the majority (first) value. Thus, step 212 may include a filtering operation to confirm that setting the configuration parameter to the first value for all nodes in the subset of the plurality of nodes will result in the best or optimal performance for all nodes in the subset of the plurality of nodes.

In one example, the filtering operation may determine when the first value should not be used as the configuration parameter value for all nodes in the subset of the plurality of nodes based on a set of rules. In one example, the set of rules includes three rules: (1) If the configuration parameter of the node exhibiting the alternate value was changed from the first value to the alternate value in the past, and the change resulted in a performance improvement anywhere in the telecommunications network, then the alternate value should not be changed back to the first value; (2) If there is no evidence that a change from the alternate value to the first value will produce a performance improvement anywhere in the network, then the configuration parameters for none of the nodes in the subset of the plurality of nodes should be changed at the current time; and (3) If the lack of evidence for (2) is due to a recent (e.g., within a threshold period of time) change to the first value for the configuration parameter of one or more of the nodes in the subset of the plurality of nodes (e.g., such that there is insufficient data to indicate an impact of the change on performance), then the configuration parameters for none of the nodes in the subset of the plurality of nodes should be changed at the current time. In one example, all three rules must be satisfied by a recommended configuration parameter value.

If the processing system determines in step 212 that an observable performance improvement cannot be attributed to the configuration parameter being set to the first value (e.g., the three filtering rules enumerated above are met), then the method 200 may proceed to optional step 214 (illustrated in phantom), and the processing system may leave the configuration parameter for all nodes in the subset unchanged.

If, however, the processing system determines in step 212 that an observable performance improvement can be attributed to the configuration parameter being set to the first value (e.g., the three filtering rules enumerated above are not met), then the method 200 may proceed to step 216, and the processing system may set the configuration parameter for all nodes in the subset of the plurality of nodes to the first value. That is, the processing system may assume that the majority or most prevalent value within the reference group for the configuration parameter was carefully selected by network engineers and is likely to be a good (e.g., optimal) value for nodes that are similar to the nodes that were configured by the network engineers.

In optional step 218 (illustrated in phantom), having either left the configuration parameter for all nodes in the subset of the plurality of nodes as is, or having set the configuration parameter for all nodes in the subset of the plurality of nodes to the first value, the processing system may determine whether there are any other configuration parameters to tune for the reference group. If the processing system determines in step 218 that there are other configuration parameters to tune for the reference group, then the method 200 may return to step 208, and the processing system may select another (e.g., a second) configuration parameter of the reference group to tune.

If, however, the processing system determines in step 218 that there are no other configuration parameters to tune for the reference group, then the method 200 may proceed to optional step 220 (illustrated in phantom), and the processing system may determine whether there are other reference groups to optimize. If the processing system determines in step 220 that there are other reference groups to optimize, then the method 200 may return to step 206, and the processing system may select another (e.g., a second) reference group to optimize.

If, however, the processing system determines in step 220 that there are no other reference groups to optimize, then the method 200 may end in step 222.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, examples of the present disclosure provide an automated means for optimizing the configuration parameters of nodes in a telecommunications network, based on conformity-driven recommendations and performance-based filtering. Examples of the disclosure group nodes that share similar characteristics (e.g., serve similar areas, handle similar traffic volumes, etc.) into reference groups. Further examples of the disclosure assume that majority settings within a reference group for configuration parameters have been carefully chosen, and apply those settings to all nodes within the reference group. However, if performance-based filtering indicates a reason not to apply a majority setting (e.g., an alternate value has been shown to produce a greater improvement in performance), then the majority setting may not be applied to all nodes within the reference group.

Further examples of the disclosure may evaluate the performance impact of changes to configuration parameters. In one example, the pre- and post-change performance around each changed configuration parameter is compared, and the results are aggregated to provide a network-wide view of the impact on performance. For each change in configuration parameter P from value $v_1$ to value $v_2$, the performance data in the form of time-series for X days before and after the change may be compared to determine if there is a statistical improvement, a degradation, or no impact. In one example, the Kruskal-Wallis H-test may be used to evaluate the null hypothesis that the population median of the before and after time-series are equal. The Kruskal-Wallis H-test is a non-parametric test that is robust to outliers in data and can operate on different sizes of samples. In one examples, the time-series may be normalized by the maximum value.

The impact results may be aggregated by determining, historically for out of N changes for configuration parameter P from value $v_1$ to value $v_2$, how many of the N changes resulted in improvement versus how many of the N changes resulted in degradation versus how many of the N changes resulted in no impact. By discovering and aggregating the performance impact of network configuration parameter changes, a knowledge base may be built that proves useful for performance-based filtering (as discussed above). It is noted that the aggregation of the impact results does not attempt to discover a causal relationship between a configuration parameter change and a performance impact. There could be other configuration parameter changes that occurred close in time that have caused an observed performance impact. A temporal correlation, even if coincidental, is sufficient in one example to rule out a majority setting in favor of a performance improvement observed around a change from a majority setting to an alternate setting.

In one example, for each decision to change a configuration parameter value from an alternate (e.g., minority) setting to a majority setting, the historically observed performance impacts of changes from the majority setting to an alternate setting may be identified. For instance, if performance improvements were observed in the past in connection with a change from the value $v_1$ (majority value) to the value $v_2$ (alternate value), then a recommendation to change the value from $v_2$ to $v_1$ might be disregarded. A recommendation to change a value from $v_3$ (alternate value) to $v_1$ might be carried out because there may be a lack of historically observed performance improvements for the value $v_3$. Additionally, as discussed above, if there is no evidence of any performance impact (improvement or degradation), then a recommendation to change a value to a minority setting may be disregarded.

Experimental results have shown that the disclosed approach provides performance improvements in LTE and 5G cellular networks. Moreover, the performance-based filtering has been experimentally shown to significantly reduce the number of recommendations to change configuration parameter values (e.g., as compared to a similar approach that does not employ performance-based filtering), which implies that existing network configurations that provide optimal performance are not lost. This also makes it easier for network engineers to review recommended changes when necessary, as there are fewer recommendations to review.

Examples of the present disclosure may thus be used to optimize network performance by tuning a plurality of different configuration parameters. For instance, in one experimental case, examples of the present disclosure were used to evaluate the impact of changes to inter-frequency measurements. Inter-frequency measurements are important for cell selection and re-selection. Examples of the present disclosure recommended changes to the thresholds for inter-frequency measurements, resulting in statistical improvements in voice over LTE (VoLTE) retainability and composite quality index (CQI). That is, the recommended changes resulted in better retention of VoLTE calls and subsequent improvement to successful call terminations on the network.

In another experimental case, parameters governing when to trigger handovers were changed. Handover parameters play a significant role in determining when to trigger handovers for mobile users. Received signal reference power (RSRP) measurements of serving cells and candidate neighboring cells determine when a handover is triggered. If the serving cell RSRP falls below a threshold and a neighboring cell's RSRP is above the threshold, then a handover may be initiated. In one experimental case, a change to the threshold was recommended, resulting in improvements in handover success rates.

Another experimental case involved carrier aggregation. Carrier aggregation functionality in LTE-Advanced is used to increase the channel bandwidth and bitrate for end users. Carrier aggregation can be implemented by the cellular operator using the same channel frequency (intra-band) or different channel frequencies (inter-band). A two-way aggregation involves a primary cell and a secondary cell. One of the configuration parameters prioritizes the secondary cell based on the measured load. By changing this priority across multiple secondary cells, a network engineer can effectively load balance and potentially improve the bitrate and throughput experience for end users. An experimental recommendation was generated to adjust the secondary cell priority for carrier aggregation on a cloud RAN base station. After the recommended change was implemented, a statistical improvement was observed in downlink throughput, as well as an overall improvement to the CQI.

Another experimental case involved changes to downlink reference signal boost. Following a recommended increase in the downlink reference signals transmission power boost for some cells, a minimal degradation in the CQI was observed. Further review revealed that the downlink traffic volumes were significantly increased, indicating that the cells were able to carry more traffic and improve coverage. Thus, even with a slight negative impact on CQI, the overall impact of the recommended change was positive due to the improved traffic handling and coverage.

In one example, examples of the present disclosure may be applied to coordinate changes across a telecommunications network. Multiple co-occurring and unrelated configuration parameter changes or software upgrades may make the comparison of pre- and post-change performance challenging. If a performance improvement is observed after multiple co-occurring changes, it becomes difficult to localize the root cause of the performance improvement (e.g., to identify which change or changes caused the performance improvement). The effects of some changes may also cancel out the effects of other changes. Thus, changes are coordinated across the telecommunications network in one example. The changes may be coordinated on the day that the changes are made, as well as during the pre- and post-change analysis. Given the increasing rate of changes being deployed in large operational networks, as well as increasing levels of automation, coordination of changes and spacing out of configuration parameter change recommendations may be important.

Further examples of the present disclosure may monitor nodes that are in power saving mode. Nodes which are explicitly put into power saving mode to conserve power may not be able to provide data from which pre- and post-change performance can be evaluated (however, service performance tends not to be affected by the nodes entering power saving mode, since neighboring nodes are available to handle traffic). There is a risk that a change to a configuration parameter could negatively impact the performance of a node once the node exits the power saving mode, making the pre- and post-change analysis important for determining whether to keep the change or undo the change. In one example, power saving mode may be turned off for the duration of the method 200 and the pre- and post-change analysis.

In further examples, user behavior changes may be monitored and correlated to changes performance metrics. User traffic and handover patterns are an important factor in determining service performance metrics such as data throughput and voice call retainability. An increase in the number of users typically leads to an increase in the utilization of the radio resources, and can also lead to a decrease in data throughput. For some configuration parameter changes, a significant improvement in data throughput may be observed. However, the improvement may not be wholly attributable to the change. For instance, locations served by certain cells may be subject to predictable variations in user traffic and behavior (e.g., schools closing for winter break). A reduction in traffic will also improve data throughput. Thus, an awareness and correlation of user behavior changes will help to assess the true impact of a configuration parameter change.

Further examples of the present disclosure account for dependencies among configuration parameters. For instance, in order to obtain a desired improvement in performance, two or more configuration parameters may need to be changed simultaneously. For instance, certain configuration parameters may be changed for data and voice sessions simultaneously rather than for data and voice sessions individually. Thus, when making a recommendation to change a configuration parameter, the recommendation may incorporate dependencies across multiple configuration parameters that simultaneously influence performance. Another instance in which dependencies may influence outcome is from the element management system perspective, whereby configuration parameters might be permitted as long as dependent changes are inherently incorporated. As an example, a carrier aggregation parameter may not be changed on a cell unless carrier aggregation functionality is enabled on the base station of which the cell is a part.

Further examples of the present disclosure may capture the impact of tradeoffs between coverage and service performance. It is challenging to capture tradeoffs between network coverage and service performance. Different locations and different network engineers may have different tolerance levels. For instance, a network engineer may not accept even a minor degradation to voice call retainability at a hospital location, even if a large improvement in data throughput can be obtained. On the other hand, such a tradeoff might be acceptable, or even desirable, in a tourist attraction location, at a sports stadium, or the like, where there is an incentive to provide high data throughput and low latency. The CQI may also be susceptible to variations in traffic. For cells carrying very low volumes of traffic especially, service performance metrics such as accessibility or retainability would vary dramatically in comparison to high traffic serving locations.

FIG. 4 depicts a high-level block diagram of a computing device or processing system specifically programmed to perform the functions described herein. As depicted in FIG. 4, the processing system 400 comprises one or more hardware processor elements 402 (e.g., at least one central processing unit (CPU), a microprocessor, or a multi-core processor), a memory 404 (e.g., random access memory (RAM) and/or read only memory (ROM)), a module 405 for optimizing long term evolution/fifth generation network service through conformity-based recommendations, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for optimizing long term evolution/fifth generation network service through conformity-based recommendations (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for optimizing long term evolution/fifth generation network service through conformity-based recommendations (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
grouping, by a processing system including at least one processor, a plurality of nodes of a telecommunications network into a plurality of reference groups, based on a plurality of configuration attributes and on a plurality of load, mobility, radio frequency attributes for the plurality of nodes, wherein the plurality of configuration attributes is selected using a supervised machine learning technique and the plurality of load, mobility, radio frequency attributes is selected using an unsupervised machine learning technique;
selecting, by the processing system, a first reference group of the plurality of reference groups, where the first reference group includes a subset of the plurality of nodes;
selecting, by the processing system, a first configuration parameter of the first reference group to be tuned, wherein values of a setting for the first configuration parameter vary over the subset of the plurality of nodes, and wherein the first configuration parameter is at least one of: a minimum required receive frequency level in a cell of the telecommunications network, a threshold for inter-radio access technology measurements, a threshold for inter-frequency measurements, a threshold for received signal reference power for a serving cell of the telecommunications network, a threshold for received signal reference power of the serving cell for a start of inter-frequency measurements, a threshold for received signal reference power of intra-frequency of a neighboring cell, or a maximum output power of the cell per antenna;
identifying, by the processing system, a first value that occurs most frequently within the values;
determining, by the processing system, that an observable performance improvement in the telecommunications network is attributed to the first configuration parameter being set to the first value; and
setting, by the processing system, the first configuration parameter for all nodes in the subset of the plurality of nodes to the first value.

2. The method of claim 1, wherein the plurality of configuration attributes comprises attributes of the plurality of nodes that do not change over time.

3. The method of claim 2, wherein the plurality of configuration attributes comprises at least one of: a hardware type, an equipment vendor, or a downlink channel bandwidth.

4. The method of claim 1, wherein the plurality of load, mobility, radio frequency attributes comprises attributes of the plurality of nodes that change over time.

5. The method of claim 4, wherein the plurality of load, mobility, radio frequency attributes comprises at least one of: a traffic byte volume, a number of user sessions, an intra frequency handover pattern, an inter frequency handover pattern, or a channel quality.

6. The method of claim 1, wherein the plurality of configuration attributes and the plurality of load, mobility, radio frequency attributes are equal for all nodes in the subset of the plurality of nodes.

7. The method of claim 6, wherein the plurality of configuration attributes and the plurality of the load, mobility, radio frequency attributes are selected for the first configuration parameter, and the plurality of nodes may be is grouped into a different plurality of reference groups based on different configuration attributes and different load, mobility, radio frequency attributes selected for a second configuration parameter.

8. The method of claim 1, wherein the plurality of load, mobility, radio frequency attributes is represented using time-series data.

9. The method of claim 1, wherein the observable performance improvement relates to a performance of the telecommunications network with respect to at least one of: a voice and data accessibility, a retainability, a downlink and uplink throughput, an inter/inter frequency handover success rate, a call duration and a number of calls, or a time spent on each technology.

10. The method of claim 1, wherein the determining includes determining that no alternate value for the first configuration parameter among the subset of the plurality of nodes has contributed to a greater performance improvement in the telecommunications network.

11. The method of claim 1, wherein the determining includes determining that there is data to attribute the observable performance improvement in the telecommunications network to the first configuration parameter being set to the first value.

12. The method of claim 1, wherein the supervised machine learning technique comprises a collaborative filtering approach with a Chi-square test of independence to identify an association between the plurality of configuration attributes and the first configuration parameter.

13. The method of claim 1, wherein the unsupervised machine learning technique comprises a k-means clustering.

14. The method of claim 13, wherein the k-means clustering identifies a respective label for each node of the plurality of nodes relating to a given load, mobility, radio frequency attribute.

15. A non-transitory computer-readable medium storing instructions which, when executed by a processing system including at least one processor, cause the processing system to perform operations, the operations comprising:
grouping a plurality of nodes of a telecommunications network into a plurality of reference groups, based on a plurality of configuration attributes and on a plurality of load, mobility, radio frequency attributes for the plurality of nodes, wherein the plurality of configuration attributes is selected using a supervised machine learning technique and the plurality of load, mobility, radio frequency attributes is selected using an unsupervised machine learning technique;

selecting a first reference group of the plurality of reference groups, where the first reference group includes a subset of the plurality of nodes;

selecting a first configuration parameter of the first reference group to be tuned, wherein values of a setting for the first configuration parameter vary over the subset of the plurality of nodes, and wherein the first configuration parameter is at least one of: a minimum required receive frequency level in a cell of the telecommunications network, a threshold for inter-radio access technology measurements, a threshold for inter-frequency measurements, a threshold for received signal reference power for a serving cell of the telecommunications network, a threshold for received signal reference power of the serving cell for a start of inter-frequency measurements, a threshold for received signal reference power of intra-frequency of a neighboring cell, or a maximum output power of the cell per antenna;

identifying a first value that occurs most frequently within the values;

determining that an observable performance improvement in the telecommunications network is attributed to the first configuration parameter being set to the first value; and setting the first configuration parameter for all nodes in the subset of the plurality of nodes to the first value.

16. The non-transitory computer-readable medium of claim 15, wherein the plurality of configuration attributes comprises at least one of: a hardware type, an equipment vendor, or a downlink channel bandwidth.

17. The non-transitory computer-readable medium of claim 15, wherein the plurality of load, mobility, radio frequency attributes comprises at least one of: a traffic byte volume, a number of user sessions, an intra frequency handover pattern, an inter frequency handover pattern, or a channel quality.

18. The non-transitory computer-readable medium of claim 15, wherein the plurality of configuration attributes and the plurality of load, mobility, radio frequency attributes are equal for all nodes in the subset of the plurality of nodes.

19. The non-transitory computer-readable medium of claim 15, wherein the observable performance improvement relates to a performance of the telecommunications network with respect to at least one of: a voice and data accessibility, a retainability, a downlink and uplink throughput, an inter/inter frequency handover success rate, a call duration and a number of calls, or a time spent on each technology.

20. A device comprising:

a processing system including at least one processor; and a non-transitory computer-readable medium storing instructions which, when executed by the processing system, cause the processing system to perform operations, the operations comprising:

grouping a plurality of nodes of a telecommunications network into a plurality of reference groups, based on a plurality of configuration attributes and on a plurality of load, mobility, radio frequency attributes for the plurality of nodes, wherein the plurality of configuration attributes is selected using a supervised machine learning technique and the plurality of load, mobility, radio frequency attributes is selected using an unsupervised machine learning technique;

selecting a first reference group of the plurality of reference groups, where the first reference group includes a subset of the plurality of nodes;

selecting a first configuration parameter of the first reference group to be tuned, wherein values of a setting for the first configuration parameter vary over the subset of the plurality of nodes, and wherein the first configuration parameter is at least one of: a minimum required receive frequency level in a cell of the telecommunications network, a threshold for inter-radio access technology measurements, a threshold for inter-frequency measurements, a threshold for received signal reference power for a serving cell of the telecommunications network, a threshold for received signal reference power of the serving cell for a start of inter-frequency measurements, a threshold for received signal reference power of intra-frequency of a neighboring cell, or a maximum output power of the cell per antenna;

identifying a first value that occurs most frequently within the values;

determining that an observable performance improvement in the telecommunications network is attributed to the first configuration parameter being set to the first value; and setting the first configuration parameter for all nodes in the subset of the plurality of nodes to the first value.

* * * * *